MAGNETIC RECORDING AND REPRODUCING

Filed Feb. 6, 1945 3 Sheets-Sheet 1

Fig. 6-A

INVENTOR.
J. P. ARNDT, JR.
J. E. SHOMER, JR.
BY Pirelas & Greene
ATTORNEYS

MAGNETIC RECORDING AND REPRODUCING

Filed Feb. 6, 1945 3 Sheets-Sheet 2

INVENTOR.
J. P. ARNDT, JR.
J. E. SHOMER, JR.
BY
Pinelas & Greene
ATTORNEYS

Sept. 5, 1950 J. P. ARNDT, JR., ET AL 2,521,623

MAGNETIC RECORDING AND REPRODUCING

Filed Feb. 6, 1945 3 Sheets-Sheet 3

INVENTOR.
J. P. ARNDT, JR.
J. E. SHOMER, JR.

BY Pirelli & Greene

ATTORNEYS

Patented Sept. 5, 1950 2,521,623

UNITED STATES PATENT OFFICE 2,521,623

MAGNETIC RECORDING AND REPRODUCING

John P. Arndt, Jr., Euclid, and John E. Shomer, Jr., Berea, Ohio, assignors to The Brush Development Company, Cleveland, Ohio, a corporation of Ohio Application February 6, 1945, Serial No. 576,386

19 Claims. (Cl. 171—95)

This invention relates to magnetic recording and reproducing and it has among its objects novel methods and arrangements utilizing a frequency modulated carrier for magnetically recording signals that are to be reproduced and novel systems for analyzing transient signals.

The foregoing and other objects of the invention will be best understood from the following description of exemplifications thereof, reference being had to the accompanying drawings wherein Fig. 1 is a block diagram of a transient analyzer system exemplifying one form of the invention;

Figure 6:
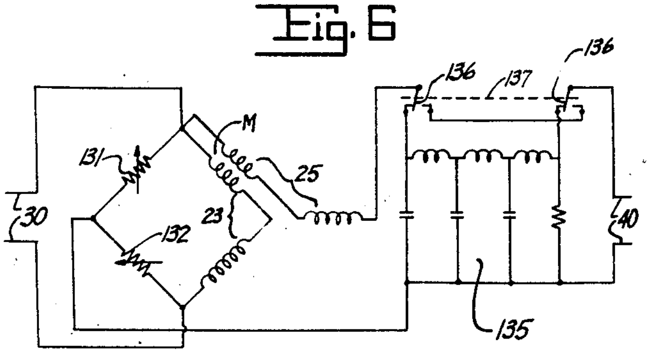
Fig. 6 is a circuit diagram of the interconnections of the recording and reproducing heads of Fig. 1.
Figure 6:
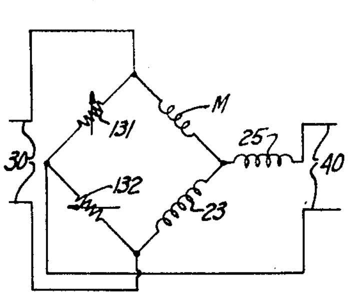

Fig. 6*a* is an equivalent circuit of the interconnections shown in Fig. 6; and

Figure 1:
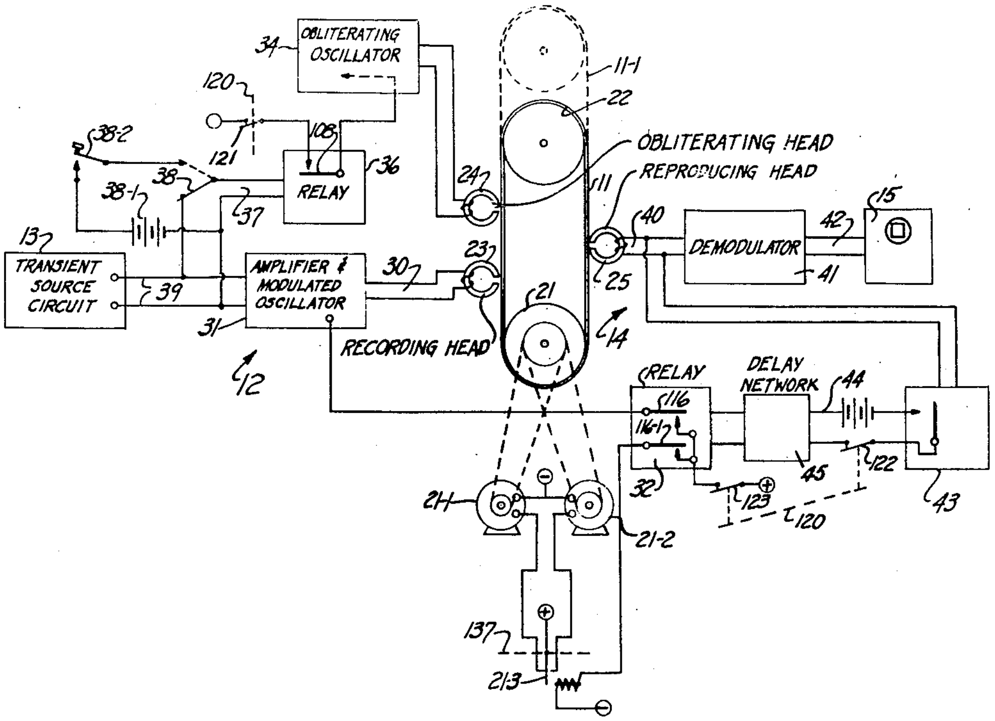

Fig. 7 is a circuit diagram illustrating a modified form of the reproducing and demodulating system of an analyzer of the type shown in Fig. 1.

The applications of S. J. Begun, Serial No. 399,909 filed June 26, 1941, now abandoned, and its continuation-in-part Serial No. 540,667, filed June 16, 1944, now Patent No. 2,419,195 granted April 22, 1947, disclose a magnetic recording system in which the desired signal is recorded as a signal modulated carrier frequency which is reproducibly recordable on a magnetic recording medium, and the desired signal is derived from such record by demodulating the reproduced modulated carrier frequency.

Among the various applications in which such magnetic recording systems are of importance, is the field of transient analyzers of the type disclosed in the application of S. J. Begun, Serial No. 425,304, filed January 1, 1942, now Patent No. 2,378,388 granted June 19, 1945. In such transient analyzer, the electric transient is recorded on an endless magnetic recording track formed by a disc, tape, or wire. The recorded transient is then cyclically played back from the synchronously operating recording medium, and the cyclically reproduced output signals are visually observed on an analyzing device, such as a conventional oscilloscope.

In order to make it possible to record magnetically and to reproduce from the records transient signals having important low frequency components, it is necessary to use modulated carriers for magnetically recording such signals, in accordance with the principles explained in United States Patent No. 2,419,195 referred to above. Furthermore, in order to enable cyclical reproduction of the recorded transient signal, an endless magnetic recording track has to be used, and an endless loop of magnetic tape or wire has been found to be a very desirable recording medium for such transient analyzers.

The available magnetic recording media, such as magnetic tape, wire or discs, exhibit magnetic non-uniformities or irregularities along the length of the magnetic track on which the record is made on such media. Because of these irregularities, the carrier signal is not uniformly recorded on such recording media, and, as a result, the reproduced carrier exhibits a noise envelope, and the demodulated output contains in addition to the transient signal a substantial noise component.

Furthermore, since it is desirable to operate such transient analyzers with an endless magnetic record loop, which contains an irregularity at the point where the ends of a tape or wire are joined, as by soldering or welding, the loop joint alters its magnetic properties so that the carrier is recorded with only a very small amplitude on such joint. As a result, the carrier is recorded with a strong downward pulse modulation at the tape joint, and the reproduced record exhibits a corresponding large change which is very disturbing.

To overcome these noise difficulties, attempts have been made to use the principles of the successful frequency modulation systems for magnetically recording such transient signals. It has been generally recognized that when using frequency modulation carrier systems for reducing extraneous noise, it is essential to modulate the carrier with a frequency deviation which is of a higher order than the frequency of the desired modulating signal, because, in suppressing noise, frequency modulation with a frequency deviation of the order of the frequency of the modulating signal would ordinarily present no great advantage over amplitude modulation. Accordingly, all prior systems in which frequency modulation of a carrier was used for suppression of noise and high quality signal transmission have been always designed for operation with a frequency deviation which is at least about five times greater than the maximum signal or audio-frequency which is to be transmitted, and the success of the accepted frequency modulation system in suppressing noise is based on this factor.

However, when attempts were made to suppress noise by using the successful carrier frequency modulation systems for magnetically recording and reproducing desired signals other types of difficulties appeared.

One source of difficulties encountered when using a frequency modulated carrier in a magnetic recording system is due to the fact that the variation in the speed of the recording medium effects a corresponding frequency modulation of the recorded wave and the reproduced demodulated output will contain a corresponding component. In addition, critical conditions also arose because of the fact that in recording magnetically a pure sine wave signal, the corresponding recorded magnetic wave exhibits a substantial third harmonic due to the hysteresis loop characteristics of the magnetic medium. As a result, in reproducing magnetically recorded frequency modulated carrier waves, the reproduced output will contain, in addition to the signal modulated carrier wave, a substantial third harmonic component.

According to the invention, the foregoing difficulties encountered in making reproducible magnetic records of frequency modulated carrier waves which are effective in reducing noise and suppressing large noise disturbances, such as caused by loop joints, are eliminated by—proceeding contrary to prior art practice and—so choosing the maximum frequency deviation and the means frequency of the magnetically recordable and reproducible carrier wave in relation to the frequency range of the desired modulating signal that the maximum frequency deviation shall be of the order of the highest frequency of the modulating signal or higher and that the frequency deviation shall be of the order of the carrier frequency, but not over about 40% to 50% of the mean carrier frequency. With such magnetic recording system of the invention, the third harmonic of the lowest carrier frequency, corresponding to the lowest limit of the frequency deviation, is higher than the highest frequency of the carrier wave, and they make possible magnetic recording and reproduction of the desired modulating signal with great noise reduction and effective suppression of large noise disturbances, such as caused by loop joints.

By way of example, there are given below practical operating ranges of magnetic recording systems of the invention for recording different frequency ranges of the modulating signal:

For a modulating frequency of up to 1000 cycles per second, a frequency deviation $\Delta F$ of 1000 cycles and a mean carrier frequency F of 5000 cycles. The modulation index $\Delta F/f=1$.

For a modulating frequency of up to 1500 cycles per second, a frequency deviation $\Delta F$ of 1500 cycles and a mean carrier frequency F of 5000 cycles. The modulation index $\Delta F/f=1$.

For a modulating frequency of up to 3000 cycles per second, a frequency deviation $\Delta F$ of 4000 cycles and a mean carrier frequency F of 10,000 cycles. The modulation index $\Delta F/f=1.33$.

For a modulating frequency of up to 4000 cycles per second, a frequency deviation $\Delta F$ of 4000 cycles and a mean carrier frequency F of 10,000 cycles. The modulation index $\Delta F/f=1$.

Referring to Fig. 1, the transient analyzer exemplifying the invention has a recording medium 11, on which a record corresponding to the transient signal which is to be studied may be made; recording means, generally designated 12, and also embodying the control circuits arranged to assure that a transient occurring at any unpredictable time on an electrical circuit system 13 subjected to predetermined normal circuit conditions, will cause the recording means to record a signal corresponging to the transient on the recording medium 11; and reproducing means, generally designated 14, arranged to reproduce the recorded signal and to deliver to an output device, such as an oscilloscope 15, an output which makes it possible to observe and study an image corresponding to the transient occurrence.

Any of the known endless magnetic recording media may be used as the magnetic recording medium for such transient analyzer. The magnetic recording medium may be formed of a rotatably mounted disc having a magnetizable surface layer on which a magnetic recording head may record a magnetic signal on a circular magnetic record track so that depending on the radial position of the recording head, an endless magnetic recording track of greater or smaller length may be provided.

Alternatively, the magnetic recording medium may be formed of a series of endless magnetic loops in the form of tapes or wires, as shown, suitably driven at the required constant speed so that depending on the length of the magnetic record loop, an endless recording medium of a shorter or longer operating cycle may be available.

In the arrangement shown, the magnetic record loop 11 is guided and impelled by a suitably mounted motor-driven roller 21 and an additional adjustably mounted idler roller 22 which may be adjusted so that loops of various lengths, such as the full-line loop 11 or the longer dotted-line loop 11—1 may be guided and impelled at a constant speed along the periphery of the two rollers.

The recording means 12 utilize a magnetic head 23 having windings and a magnetic core structure arranged so as to record on consecutive elements of the recording magnetic record loop 11, shown moving in clockwise direction past the magnetic gap of the core structure, elemental magnet waves corresponding to the currents supplied to the windings of the magnetic head 23. The recording means are also provided with a similar magnetic obliterating head 24 arranged so as to controllably obliterate and restore to a substantially neutral magnetic condition each element of the magnetic recording medium moving past the magnetic gap of the core structure of the obliterating head.

The magnetic recording head 23 and the obliterating head 24 may be of the type described in the now abandoned application of S. J. Begun et al., Serial No. 550,570, filed August 22, 1944, or its continuation-in-part Serial No. 688,738 filed August 6, 1946 now Patent 2,513,617, issued on July 4, 1950 and the two heads are so arranged along the path of the moving magnetic record track 11 that as long as the obliterating head 24 is excited by obliterating current, each element of the magnetic record track 11 moving past it will be restored to a uniform neutral magnetic condition.

The magnetic recording medium is also designed for cooperation with a magnetic reproducing head 25 which may be similar to the magnetic recording head, the reproducing head 25 forming part of the reproducing means and being designed so that each magnetic wave recorded on the endless recording track 11 moving past it will induce a corresponding signal voltage in the windings of the reproducing head 25.

The transient input circuit 13 is connected to the windings of the recording head 23 through a recording circuit 30 including an amplifier and modulated oscillator 31, the operation of which is controlled by an electronic relay arrangement 32 which stops the recording operation when the electronic relay 32 completes its circuit.

The obliterating head 24 is supplied with the alternating obliterating current from an obliterating oscillator 34 through an obliterating circuit including an electronic relay switch 36, the operation of which is controlled by a control circuit 37 which is shown connected through an auxiliary switch 38 to the two leads 39 through which the electric circuit system 13 impresses the transient upon the recording circuit 30. The auxiliary switch 38 may be moved from the position shown to the dotted line position so that the operation of the electronic relay 36 may be independently controlled by an auxiliary testing circuit including an auxiliary supply source shown in the form of a battery 38—1 and a test switch 38—2. The reproducing head 25 of the reproducing means is connected to the oscilloscope through a reproducing circuit 40 including an amplifier and demodulator 41.

In accordance with the invention, a transient analyzer of the foregoing type, designed for selective operation with endless recording tracks of different lengths and having operating cycles of different duration and equipped with a distinct reproducing head, is provided with a control interconnection between the reproducing circuit and the recording circuit for bringing about automatic stoppage of the recording operation when a transient occurrence has been recorded on the endless recording track irrespective of the length of the recording cycle of the particular endless recording track used.

In the arrangement shown in Fig. 1, the control interconnection between the reproducing and the recording circuit is formed by an electronic relay 43, the input circuit of which is connected to the reproducing circuit 40, and the electronic relay 43 in turn is utilized to complete a control circuit 44 to the electronic relay 32 so as to selectively stop or start the recording operation in response to predetermined variations in the operating conditions of the reproducing circuit explained hereinafter, a time delay network 45 being connected in the control circuit 44 between relay 43 and relay 32.

The specific transient analyzer shown diagrammatically in Fig. 1 was designed in accordance with the principles of the invention so as to have the following operating characteristics:

The characteristics of the magnetic recording track 11 and the frequency of the carrier should be such as to make the frequency response of the recorder flat to within ±2% for all transient frequencies between 1 and 100 cycles per second.

The recorded signal amplitude should be directly proportional to the input signal amplitude to within 3% over a range of at least 30 db.

The dynamic range or signal-to-noise ratio should be at least 30 db.

The idler roller 22 should be adjustable to permit the operation of the recorder with loops of different lengths and the speed with which the magnetic track loop 11 is impelled should be such as to enable operation with endless loop cycles between $^1/_{10}$ of a second up to ½ of a second recording time.

The fluctuation of the speed of the magnetic record track 11 should be less than ½%.

During the reproducing or playback process, the record track should be driven at higher speed, 3 or more times higher than the speed at which it is driven during the recording process, so that the output signal may be readily analyzed with the available analyzing apparatus.

Physical limitations made it advisable to operate with a minimum loop length of about 18 inches. This, together with the desired minimum time of $^1/_{10}$ of a second for a complete loop cycle, made it advisable to use a minimum record track velocity of 15 feet per second during recording and 45 feet per second during reproduction, and these speeds were found to be more than adequate for proper magnetic recording of the carrier frequency employed in this specific analyzer.

The transient analyzer shown in Fig. 1 is designed to operate in the following manner: Under normal conditions, the recording head 23 is supplied with a carrier current from the oscillator circuit 30. The oscillator 31 is arranged to be frequency modulated by a transient signal which occurs on the electric test circuit 13. As long as the electric circuit 13 is under normal operating conditions and no electric transient occurs thereon, the modulated oscillator 31 impresses on the recording head 23 the unmodulated carrier oscillations which are recorded on the moving record track 11. The record track 11 passes almost directly from the recording head 23 to the obliterating head 24, which removes the newly recorded unmodulated carrier by the action of a strong alternating current field produced by the current from the obliterating oscillator 34.

In the analyzer shown, the obliterating oscillator 34 is designed to operate with a frequency of 35 kilocycles. As a result, most of the recording track including the part which moves past the reproducing head 25 is kept in a demagnetized neutral condition and no carrier output is picked up by the reproducing head 25.

When a transient signal occurs in the test circuit 13, it frequency modulates the carrier produced by the oscillator of the recording circuit 30. The start of the transient signal actuates the electronic relay 36 to immediately shut off the obliterating circuit so that the newly recorded frequency modulated carrier, plus the portion of the unmodulated recorded carrier that existed between the recording and the reproducing heads at the moment the transient started, are not obliterated.

Now that the obliterating process is stopped, one element of the recording track 11 approaching the reproducing head 25 has on it the beginning of the recorded carrier corresponding to the point at which obliterating stopped. When this element of the recording track 11, which has on it the beginning of the recorded carrier, reaches the reproducing head 25, the varying magnetic pattern on the record track induces in the reproducing head 25 a corresponding carrier voltage. As soon as this carrier voltage appears in the reproducing circuit, the electronic relay 43 of the reproducing circuit is actuated to send through the control circuit 44, including the time delay network 45, a control signal to the electronic relay 32 for actuating the latter to stop the recording operation substantially at the moment when the recording on the full length of the record track loop 11 has been completed.

In the course of the further operation, the endless recording track 11 with the modulated carrier wave recorded thereon, is repeatedly impelled past the reproducing head 25 so that the reproducing head 25 picks up an output which consists of a carrier frequency which is frequency modulated in accordance with the original transient, and this composite signal is repeated once for every cycle of the endless record track 11. The modulated carrier output of the reproducing head 25 is demodulated by the demodulator 41 so that fascimiles of the original transient signal impressed on the recording circuit 39 are now impressed on the output terminals of the reproducing circuit, and may be observed on a cathode ray oscillograph indicated at 15 having a sweep circuit synchronized with the signal or with the cyclical motion of the endless recording track 11. The recorder arrangement shown thus converts a transient which cannot be readily observed on a cathode ray oscillograph into a continuous sequence of signals each of which is a facsimile of the transient, and this continuous sequence of signals may be readily observed on a conventional oscillograph or applied to any type of analyzing apparatus.

The specific equipment shown in the drawing is designed to record transient signals having frequency components between ½ and 100 cycles. In reproduction, the tape speed is increased by a factor of 3 so that the output falls in the frequency range of 1.5 to 300 cycles, a range which is more readily handled by conventional analyzing apparatus.

In general, the speed with which the magnetic recording track is impelled is so chosen that a substantial length of the recording track passes the head during one cycle of the recorded alternating current. The recording track 11 may be driven at two different speeds by providing two synchronous driving motors 21—1, 21—2, one rotating with 1200 R. P. M. and one with 3600 R. P. M., each connected through a belt to the drive roller 21 so that as soon as a record of a transient is made, the operation of a common motor control switch 21—3 effects a change of the speed with which the record track 11 is driven.

The specific analyzer of the type shown in Fig. 1 is designed in accordance with the principles of the invention to accommodate five different endless magnetic tracks 11 providing recording times from 1/10 to 1/5 of a second. The shortest record loop has a length of about 18 inches and it is moved with a velocity of 15 feet per second during the recording process to provide a recording cycle of 1/10 of a second.

Figure 2:
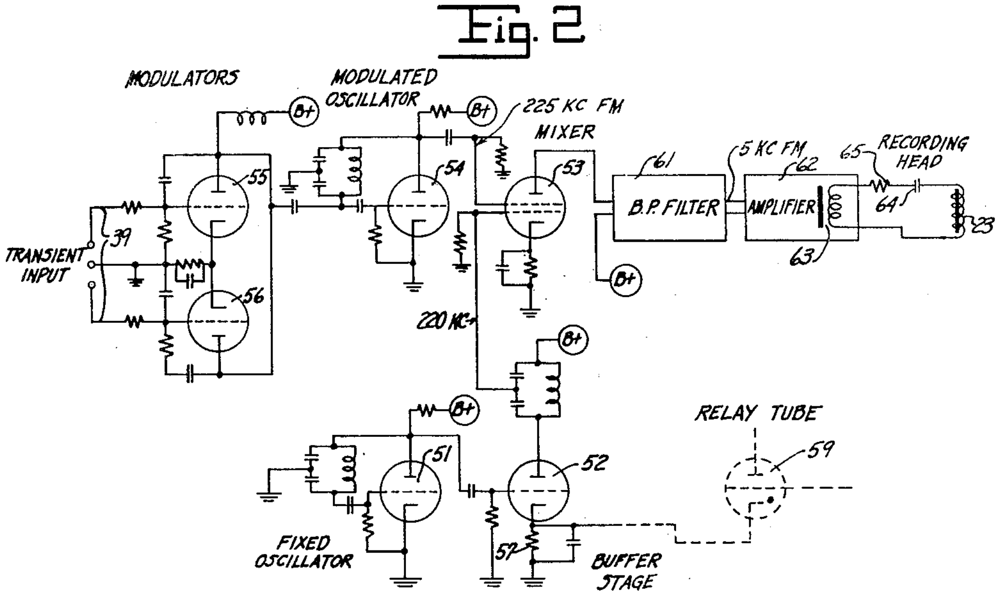
Fig. 2 is a simplified circuit diagram of the recording circuit of the analyzer shown in Fig. 1.

Fig. 2 indicates in simplified form the frequency modulated oscillator circuit 31 of the recording circuit 30 designed in accordance with the principles of the invention in order to operate in the manner outlined above. As indicated in Fig. 2, a beat frequency oscillator is used to provide carrier oscillations having a frequency of 5,000 cycles per second. The beat frequency oscillator is shown composed of a fixed oscillator associated with tube 51 which is connected through a buffer stage including tube 52 to a mixer tube 53 in which the output of the fixed oscillator is combined with the output of a modulated oscillator associated with tube 54 to provide the 5,000 cycle carrier at the output terminals of the mixer tube 53.

In the specific oscillator arrangement shown, the fixed oscillator is generating oscillations of 220 kilocycles and the modulated oscillator 54 is operating with a mean frequency of 225 kilocycles. The modulator is designed for operation with a frequency swing of 1100 cycles on either side of the 5,000 cycle carrier wave, giving a range of frequency deviation between 3900 cycles and 6100 cycles. This range of frequency deviation represents a very substantial percentage of the mean carrier frequency of 5000 cycles, yet it is sufficiently less than an octave so that all carrier harmonics fall outside the frequency band occupied by the carrier.

The equipment is able to magnetically record and to reproduce signals of frequencies up to frequencies of the order of the deviation frequency.

Since it is desired to keep the noise output due to speed variations at least 40 db. below the full signal output, provision is made that the variation in the frequency of the reproduced carrier due to speed instability should not be over 1% of the maximum frequency modulation swing, that is, not over .22%. Such degree of speed stability may be easily obtained by providing one of the rollers 21, 22 with a fly wheel and supplying the driving forces to the drive roller 21 through an elastic drive connection, such as a dental belt.

The transient signal is impressed on the modulated oscillator 54 through two push-pull reactance tube modulators 55, 56 so as to reduce the effect of changes in the line voltage, tube characteristics and other parameters on the frequency of the oscillator. In order to controllably stop the recording process, the buffer tube 52 is utilized as the electronic relay. As shown, the cathode circuit of the buffer stage tube 52 includes a cathode resistor 57 which is connected in the circuit of a gaseous relay tube 59 in such manner that when the relay tube 59 is excited, it passes through the cathode resistor 57 of the buffer tube 52 a current large enough to block the discharge through the buffer tube and the passage of the oscillations of the oscillator 51 to the mixer tube 53.

The frequency modulated output developed in the output circuit of the mixer tube 53 is delivered through a band-pass filter 61 and an amplifier 62 to the windings of the recording head 23. The reactance of the recording head and the leakage reactance of the output transformer 63 of the amplifier 62 are tuned out by a series condenser 64 so that the unmodulated recording current is in phase with the signal at the grids of the output stage. Furthermore, the output circuit is designed to include sufficient resistance 65 to ensure linear phase shift for the frequency band occupied by the modulated carrier.

In addition, in order to assure maximum utilization of the dynamic range of the magnetic recording medium, the recording circuit is designed so that the magnetic head operates essentially with a constant flux throughout the frequency range of the recording process.

Figure 3:
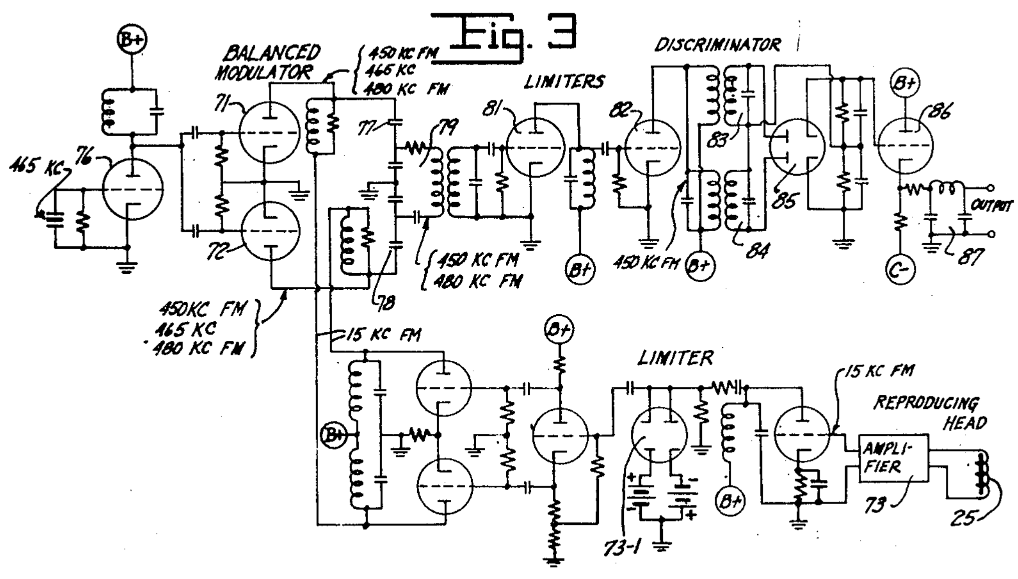
Fig. 3 is a simplified diagram of the reproducing and demodulating circuit of the analyzer shown in Fig. 1.

In Fig. 3 is shown in simplified form one form of a demodulator circuit designed in accordance with the invention for a reproducing circuit 14 of a transient analyzer shown in Fig. 1. In the specific analyzer shown and described above—with the recording track driven during the reproducing process at 3 times greater speed than in the recording process—the carrier output of the reproducing head 25 has a frequency of 15,000 cycles per second, and under full modulation, this output frequency swings down to approximately 12,000 cycles and up to approximately 18,000 cycles. This reproduced, frequency-modulated, 15-kilocycle carrier is amplified, heterodyned to a relatively high frequency, limited, and then subjected to the action of a conventional discriminator and detector in the manner indicated in Fig. 3.

As shown in Fig. 3, the carrier output of the reproducing head is amplified and applied to a balanced modulator which is indicated by two electron amplifier tubes 71, 72 connected in a balanced modulating circuit. The circuit connecting the reproducing head to the balanced modulator 71—72 includes an amplifier 73 and a balanced amplitude limiter including diode 73—1 to maintain substantially 100% modulation. The modulator associated with tubes 71, 72 is excited by an auxiliary oscillator including tube 76, which, in the specific exemplification shown, is indicated as being controlled by a crystal to provide an oscillation frequency of 465 kilocycles.

As a result of this modulation process, the balanced modulator 71—72 has an output consisting of an upper side-band having a mean frequency of 480 kilocycles, and a lower side-band having a mean frequency of 450 kilocycles. When the 15 kilocycles modulating signal is in itself frequency modulated in accordance with the transient, the 480 and 450 kilocycle side-bands developed by the balanced modulator 71—72 partake of the same frequency modulation, the maximum frequency deviation being approximately ±3300 cycles.

As indicated in Fig. 3, the output circuit of the balanced modulator 71—72 is combined with three tuned circuits 77, 78, 79 designed to suppress the upper side-band and to pass essentially only the frequency modulated 450 kilocycle signal to the limiter stage of tubes 81, 82 designed so as to wipe out variations in the amplitude of the modulated 450 kilocycle signal. All of the foregoing reproducing circuits are designed so as to ensure relatively linear phase shift conditions over the frequency band occupied by the modulated carrier.

After passing the limiter stages of tubes 81, 82, the frequency modulated carrier is applied to a balanced discriminator having two tuned circuits 83, 84 which are connected to a balanced detector associated with diode tube structure 85, the two resonant circuits 83, 84 of the discriminator being tuned to resonant frequencies displaced symmetrically above and below 450 kilocycles so as to derive from the output circuit of the detector stage of tube 85 a signal corresponding to the modulating signal or the transient.

The output of the detector stage 85 is impressed through a circuit including a cathode follower tube 86 and a filter stage 87 on the output leads 42 of the reproducing circuit, the cathode follower tube 86 providing a low output impedance for the reproducing circuit. The filter 87 is a simple low-pass filter and it is designed to serve the following purposes:

For practical reasons, the balanced modulator of the type indicated in Fig. 3 will not suppress completely the 465 kilocycle signal, and the circuits which are tuned to 450 kilocycles cannot be expected to suppress completely the desired 480 kilocycle sideband or the residual 465 kilocycle signal. As a result, some undesired components of the amplitude modulated 465 kilocycles will reach the discriminator. At first thought this would seem to be of no consequence since the system contains amplitude limiters that will remove any residual amplitude modulation arising from the presence of the undesired frequency components. However, the residual undesired components of the 465 kilocycle amplitude modulated signal give rise to a phase modulation effect of substantial magnitude, resulting in an undesired 15 kilocycle and a 30 kilocycle signal component of substantial amplitude in the output circuit of the reproducing system. The low-pass filter 87 is designed to suppress these undesired frequency components.

In Fig. 7 is shown a reproducing circuit for a recorder of the type described above using a different direct type of discriminator circuit in which the reproduced frequency modulated carrier delivered by the reproducing head 25—at the original reproduced carrier frequency— is amplified in an amplifier 91, limited by a limiter 92, and after passing through a low-pass filter 93, is subjected to the action of a discriminator and detector associated with tube 94, the output of which is impressed through another low-pass filter 95 on the output leads of the reproducing circuits.

In the reproducing circuit of Fig. 7, the discriminating action is obtained by a differentiating network consisting of a small series condenser 96 and a small shunt resistance 97 which may readily be designed and correlated to effect a linear demodulation of a frequency modulated carrier signal occupying a relatively wide frequency band, provided the frequency modulated carrier wave has not been subjected to the operation of non-linear devices, such as amplitude limiters.

Amplitude limiting, however, is necessary to remove the amplitude noise modulation resulting from the irregularities in the magnetic characteristics of the recording medium. As is known, the action of a limiter clips off the peak of the wave, and in the absence of phase shifting elements, the output of a limiter has approximately a square wave form. A true square wave consists of the original frequency plus all harmonics with amplitudes inversely proportional to the harmonic number. If a square or a substantially square wave is applied to a practical differentiating network, some significant harmonics will fall on the curved portion of the network characteristics, and as the frequency swings about its mean value, the distribution of the harmonics falling on the curved portion will vary so that as a result the rectified output of the network will not be linearly related to the original modulating signal.

To avoid these difficulties, a low pass filter 93 is placed between the limiter output and the differentiating network 96, 97 so as to substantially suppress all harmonics. This filter is so designed as to be flat and to introduce only negligible phase distortion over the band of frequencies occupied by the modulated carrier in order to assure that the output of the filter shall correspond to the input to the limiter, except that all amplitude variations have been removed. The more elaborate reproducing circuit shown in Fig. 3 utilizing a heterodyne-type demodulator makes it unnecessary to use such special filters.

Figure 4:
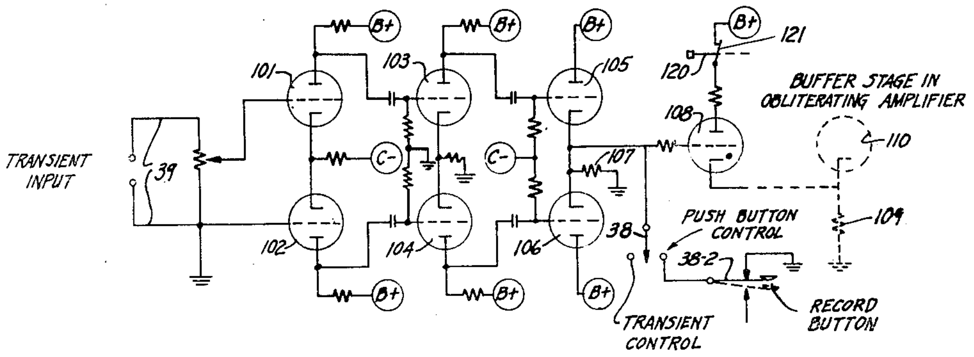
Fig. 4 is a simplified diagram of the obliteration control circuit of the analyzer of Fig. 1.

Fig. 4 shows in simplified form the electronic control circuit of the electronic relay arrangement 36 which cuts off the obliterating action of the obliterating oscillator 34 upon occurrence of a transient at the terminals of the input leads 39 of the recording circuit. It comprises an inverter amplifier stage associated with tubes 101, 102, the input side of which is connected to the transient input leads 39 of the recording circuit, and an additional push-pull voltage amplifier stage associated with tubes 103, 104, the output of which is impressed on a rectifier including two rectifier triodes 105, 106. The circuits of the two triodes 105, 106 of the rectifier are so adjusted that as long as no transient signal is impressed on the input leads 39, there is no voltage drop across the common cathode resistance 107 of the two rectifier triodes 105, 106.

When a transient signal appears on the input lead connections 39 to the electronic relay 36, the grid of one or the other of the two detector tubes 105, 106 is made less negative so that it passes a plate current which develops across the cathode resistance 107 a voltage drop which fires a grid controlled gaseous conduction thyratron tube 108. The cathode of the thyratron 108 is connected across a cathode resistance 109 of a buffer tube 110 forming part of the obliterating oscillator 34.

The circuit of the obliterating oscillator including its buffer stage tube 110 and its cathode resistance 109 are so designed that when the thyratron 108 is fired, it passes sufficient current across the cathode resistance 109 of the buffer stage as to block its action and stop the oscillations and the obliterating action of the obliterating oscillator.

Manual control may be substituted for the input control by actuating switch 38 connected to the input circuit of the thyratron tube 108 to the position where it short-circuits the cathode resistance 107 of the detector tubes 105, 106 in which switch position the tube 108 may be fired at any time by actuating the push-button switch 38—2 to the dotted-line position in which it connects the firing grid of the thyratron 108 to an auxiliary source of firing potential, such as the normal power supply indicated digrammatically in Fig. 1 by a battery.

Figure 5:
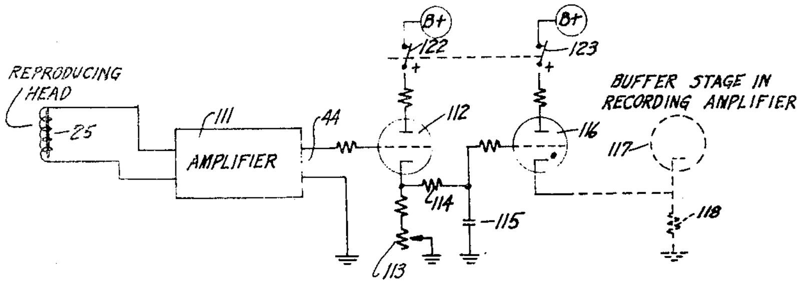
Fig. 5 is a simplified diagram of the record control circuit of Fig. 1.
Figure 5:
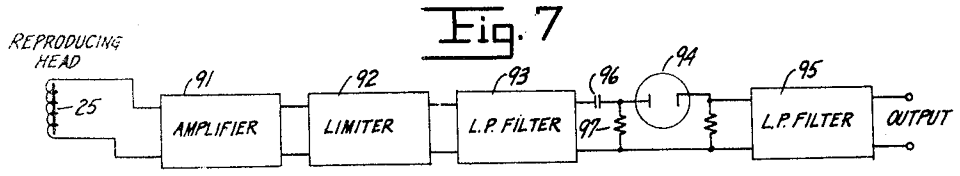

In Fig. 5 is shown in simplified form one type of circuit for electronic relay circuit 43 which is interconnected between the reproducing head and the recording circuit for automatically stopping the recording operation at the proper moment when the record of a transient made on substantially the full length of the endless continuously moving record track 11 has been completed.

It comprises a pre-amplifier 111 which is connected to the leads 40 of the reproducing head 25 so as to amplify the output of the reproducing head and apply the amplified output to a gaseous conduction thyratron tube 112. The cathode circuit of the thyratron tube 112 includes suitable resistance elements, including an adjustable vernier resistance 113, which are connected to a time delay network including resistance 114 and a condenser 115 to which the firing grid of another thyratron tube 116 is connected.

When the first thyratron tube 112 is fired, its cathode circuit applies a predetermined D. C. potential to the time delay network 114, 115. As the record track element bearing the beginning of the record of the carrier wave progresses from the reproducing head 25 toward the recording head 23, the voltage across the output of the time delay network 114, 115 builds up, and just as the record track element bearing the first recorded cycle of the carrier arrives at the recording head 23, the time delay network 114, 115 has developed a sufficient voltage across the grid of the second thyratron tube 116 as to cause it to fire.

In other words, the time constant of the resistance network 114, 115 and the applied voltages are so related that the time delay between the firing of the two thyratron tubes 112, 116 is just equal to the time required for an element of the endless record track 111 to travel from the reproducing head 25 to the recording head 23.

The recording amplifier has a buffer stage including a buffer tube 117, the cathode of which has a cathode resistance 118 which is also connected in the cathode circuit of the second thyratron tube 116 and the circuit constants of the buffer stage tube are so chosen that when the second thyratron tube 116 is fired, it passes sufficient current through the cathode resistance 118 of the buffer tube 117 to block its action and stop further recording. This arrangement is very effective in assuring that when the element of the record track 11 bearing the initial element of the recorded carrier, after passing the reproducing head 25, arrives at the recording head 23, the action of the electronic relay circuit stops the recording process.

The vernier resistance 113 of the record control circuit facilitates ready adjustment of the required time delay so as to compensate for minor variations in tube characteristics, line voltages, etc. The vernier adjustment may be made by observing on a cathode ray oscillograph the amplified carrier output of the reproducing head using a suitably synchronized sweep circuit. When the time delay is too short, a gap appears in the reproduced output and the control is then adjusted in steps while the system is alternately set and manually recorded until the gap just closes.

Means are also provided so as to enable quick resetting of the system. In the arrangement shown, the resetting means are provided by connecting in the plate circuits of the three thyratron tubes, namely, the thyratron tube 108 of the obliteration control circuit, and the thyratron tubes 112, 116 of the recording control circuit, three switch contacts 121, 122, 123 forming part of a common push button switch 120 arranged so that by momentarily actuating the push button switch 120 to open the three switch contacts, the three thyratron tubes are instantly de-energized and the entire system is restored to its original condition.

Means are also provided in order to automatically control the speed with which the endless record track is impelled so that when recording operations are carried on, the record track is automatically driven at the desired recording speed, and that when reproducing operations are carried on, the record track is automatically driven at the desired reproducing speed. Fig. 1 indicates one form of such automatic drive control arrangement.

The motor drive control switch 21—3 is made in the form of a relay, the contacts of which are biased to the position shown in which motor 21—1 is energized to drive the record track at the lower recording speed. By energizing the coil of the motor control relay 21—3, its switch contacts are actuated to the flexed position in which motor 21—1 is de-energized and motor 21—2 energized to drive the track at the higher speed required for the reproducing operation.

The operating coil of the motor control relay switch 21—3 is shown energized through a control circuit including another electronic relay element 116—1 of the record control relay 32 which operates automatically to energize the coil of the motor control switch 21—3 only when the relay 32 is operated to stop the recording operation and bring about a reproducing operation. When the system is reset by the operation of the push button switch 120 for restoring the recording operation, the coil of the motor control switch 21—3 is automatically de-energized, whereupon the motor control switch is returned to its non-operated position in which it again energizes motor 21—1 to drive the record track 11 at the required recording speed.

In order to make it possible to operate a recording system of the type described above with a very short recording track 11, the recording, reproducing and obliterating heads have to be placed very close to each other. As a result of this close spacing, both the recording and obliterating heads induce substantial signals in the reproducing head through the mutual inductance coupling of their windings. These inductive couplings do not interfere with the reproduction of the recorded transients because during reproduction, the recording and obliterating circuits are turned off. However, the inductive couplings of the several heads interfere with the operation of the relay circuits because the voltage induced by the mutual inductive couplings of such closely spaced heads is sufficient to cause premature operation of the relay circuit which stops the recording operation.

In accordance with the invention, these difficulties—caused by the inductive coupling or magnetic flux interlinkage of the windings of the reproducing head with the windings of the recording head or the obliterating head or both—are overcome by interconnecting the windings of the several heads into a neutralizing circuit which introduces into the reproducing head voltages opposite in phase and magnitude to the voltages induced therein by the mutual inductance coupling between the windings of the reproducing heads and the windings of the adjacent recording head or obliterating head or both.

Fig. 6 shows one form of such neutralizing circuit interconnecting the windings of the reproducing head with the windings of the recording head so as to neutralize the effect of the inductive coupling of the two heads, and Fig. 6*a* is an equivalent circuit of the several elements shown in Fig. 6. The recording head winding 23 is shown interconnected with two variable resistors 131, 132 so that the inductance of the recording head winding 23 and its mutual inductance M with the reproducing head 25 form two arms of a balanced bridge circuit, the two other arms of which are formed by the two resistors 131, 132.

One of the reproducing head leads 40 is connected to the mid-point between the two resistors 131, 132 and the reproducing head winding 25 has one of its ends connected to one end of the recording head winding 23 so that the voltage component developed by the recording current across the resistor 131 is introduced into the circuit of the reproducing head winding 25. The two resistors 131, 132 are so adjusted that the voltage component developed across the resistor 131 and introduced into the circuit of the reproducing head 25 is equal in magnitude and opposite in phase to the voltage induced by the recording current in the reproducing windings 25 by reason of its mutual inductance or flux interlinkage with the recording winding 23. With such arrangement, sufficiently good balance may be obtained without adjustment for the phase angles of the two reactive arms. Such neutralizing circuit arrangement may also be designed in various other ways, for instance, by interchanging the relationship of the several windings.

The voltages induced in the reproducing head windings 25 by the obliterating head 24 may be neutralized in a manner similar to that described above in connection with Figs. 6 and 6*a*. Alternatively, the difficulties due to the inductive coupling between the obliterating head and the reproducing head may be eliminated by inserting in the circuit of the reproducing head a simple low pass filter having a high attenuation at the frequency of the obliterating currents passing through the obliterating head 24, the filter being indicated at 135 in Fig. 6.

To avoid the necessity for building such filter 135 in a manner that would enable it to pass the reproduced frequency-modulated carrier oscillations without introducing distortion, switch contacts 136 may be provided and arranged to connect the filter in the reproducing circuit 40, when obliteration takes place and the switch contacts 136 are in the position shown, but to cut out the filter 135 from the reproducing circuit when the switch contacts 136 are brought to the opposite position and the record is reproduced.

The switch contacts 136 may be arranged to be operated in unison with the other switches which control the change-over from the recording to the reproducing operation and vice versa. Thus, as indicated by dotted lines 137 in Figs. 1 and 6, the switch contacts 136, 137 may be operated in unison with the motor energizing switch 21—3 by a common relay winding so that each time the motor switch is actuated to drive the endless record track at the higher or lower speed corresponding to the recording and reproducing operations, the switch contacts 136 are actuated to cut in and cut out the filter 135 from the reproducing circuit.

Although the principles of the present invention have been described above as applied to one particular type of magnetic recording, they are obviously also applicable to all types of magnetic recording, namely, longitudinal recording, perpendicular recording and transverse recording.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

We claim:

1. In a system for studying a transient electric signal which may occur in a tested circuit: a cyclically operating permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head.

2. In a system for studying a transient electric signal which may occur in a tested circuit: a cyclically operating permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head; said recording structure and said reproducing head being so located along the path of said track that said record cycle extends over the major part of said track.

3. In a system for studying a transient electric signal which may occur in a tested circuit: a cyclically operating endless permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head; and setting means including a single setting control element connected to the recording means momentary actuation of which restores the operation of said recording means.

4. In a system for studying a transient electric signal which may occur in a tested circuit: a cyclically operating endless permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head; and setting means including a single setting control element connected to the recording means and obliterating means momentary actuation of which restores the operation of the recording means and of the obliterating means.

5. In a system for studying a transient electric signal which may occur in a tested circuit: a cyclically operating endless permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signal; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head; and guide means for guiding the magnetic record track along said predetermined path including adjustably held guide elements for guiding endless record tracks of different lengths.

6. In a system for studying a transient electric signal which may occur in a tested circuit: a cyclically operating endless permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head; and track driving structure including drive control means selectably actuable to cause the record track to be driven either at a predetermined recording speed or at a higher reproducing speed.

7. In a system for studying a transient electric signal which may occur in a tested circuit: a cyclically operating endless permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head; and track driving structure including drive control means selectably actuable to cause the record track to be driven either at a predetermined recording speed or at a higher reproducing speed; said drive control means being connected to the reproducing means for causing the record track to be driven at the reproducing speed when the operation of the recording means is stopped.

8. In a system for studying a transient electric signal which may occur in a tested circuit: a cyclically operating endless permanently magnetizable magnetic record track arranged to move along a predetermined path; electrically operated recording means including an input circuit and a magnetic recording structure located along said path for magnetic linkage with successive elements of said track and continuously making records corresponding to electric conditions of said tested circuit by magnetizing the successive elements of the track; magnetic obliterating means operative to continuously obliterate the records recorded on said track by said recording structure; electrically operated reproducing means including a magnetic reproducing head located along said path in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of the recordings on said record track; and recording control means connected between the reproducing head and the recording means for actuation by a reproduced recording output to stop further recording by said recording means so as to retain on said track a record cycle made by said recording means along the track length extending between said recording structure and said reproducing head; and track driving structure including drive control means selectably actuable to cause the record track to be driven either at a predetermined recording speed or at a higher reproducing speed; said drive control means being connected to the record control means for causing the record track to be driven at the recording speed when the recording means records on the record track and for causing the record track to be driven at the reproducing speed when the operation of the recording means is stopped.

9. A system as defined by claim 5, having setting means including a single setting control element connected to the recording means, momentary actuation of which restores the operation of said recording means.

10. A system as defined by claim 6, having setting means including a single setting control element connected to the recording means, momentary actuation of which restores the operation of said recording means.

11. A system as defined by claim 7, having setting means including a single setting control element connected to the recording means, momentary actuation of which restores the operation of said recording means.

12. A system as defined by claim 8, having setting means including a single setting control element connected to the recording means, momentary actuation of which restores the operation of said recording means.

13. A system as defined by claim 5, having setting means including a single setting control element connected to the recording means and the obliterating means, momentary actuation of which restores the operation of the recording means and of the obliterating means.

14. A system as defined by claim 6, having setting means including a single setting control element connected to the recording means and the obliterating means, momentary actuation of which restores the operation of the recording means and of the obliterating means.

15. A system as defined by claim 7, having setting means including a single setting control element connected to the recording means and the obliterating means, momentary actuation of which restores the operation of the recording means and of the obliterating means.

16. A system as defined by claim 8, having setting means including a single setting control element connected to the recording means and the obliterating means, momentary actuation of which restores the operation of the recording means and of the obliterating means.

17. A system as defined by claim 1 in which the record control means include a time delay arrangement for postponing the stoppage of further recording after energization by the initially reproduced record output from an element of the record track until said record track element has moved to approximately the position of the recording structure.

18. A system as defined by claim 3 in which the record control means includes a time delay arrangement for postponing the stoppage of further recording after energization by the initially reproduced record output from an element of the record track until said record track element has moved to approximately the position of the recording structure.

19. A system for studying a transient electric signal which may occur in a tested circuit: a plurality of cyclically operating permanently magnetizable magnetic record tracks of different lengths arranged to move along predetermined paths; electrically operated recording means including an input circuit and a magnetic recording structure located along at least one of said paths for magnetic linkage with successive track elements and continuously making records corresponding to electric conditions of said tested circuit by magnetizing the successive track elements; magnetic obliterating means operative to continuously obliterate the records recorded on said track elements by said recording structure; electrically operated reproducing means including a magnetic reproducing head located in a region through which the track elements move from the obliterating means to the recording structure for cyclically reproducing the records recorded on said track and supplying during each track cycle a record output corresponding to said records; cyclically operating analyzing means connected to said reproducing means for actuation by said reproduced signal to provide an observable effect corresponding to said signals; obliteration control elements connected between the magnetic obliterating means and said input circuit for actuation in response to the occurrence of a transient signal in the tested circuit to stop obliteration of said recording; and recording control means connected between the reproducing head and the recording means for actuation by a reproduced record output to stop further recording by said recording means so as to retain a record cycle made by said record means along a track length extending between said recording structure and said reproducing head.

JOHN P. ARNDT, Jr.
JOHN E. SHOMER, Jr.

REFERENCES CITED

The following references are of record in the file of this patent:

UNITED STATES PATENTS

| Number | Name | Date |
|---|---|---|
| 2,334,726 | Rankin | Nov. 23, 1943 |
| 2,343,099 | Usselman | Feb. 29, 1944 |
| 2,351,003 | Camras | June 13, 1944 |
| 2,370,133 | Begun | Feb. 27, 1945 |
| 2,378,383 | Arndt | June 19, 1945 |
| 2,378,388 | Begun | June 19, 1945 |
| 2,439,446 | Begun | Apr. 13, 1948 |

FOREIGN PATENTS

| Number | Country | Date |
|---|---|---|
| 457,282 | Germany | Mar. 13, 1948 |